US012773992B2

(12) United States Patent
Jerg

(10) Patent No.: US 12,773,992 B2
(45) Date of Patent: Oct. 27, 2026

(54) METHOD FOR PROACTIVELY CHANGING THE CONFIGURATION OF A SPEED CONTROL SYSTEM OF A VEHICLE, COMPUTING DEVICE FOR A SPEED CONTROL SYSTEM, COMPUTER-READABLE (STORAGE) MEDIUM AND A SPEED CONTROL SYSTEM FOR A VEHICLE

(71) Applicant: Bayerische Motoren Werke Aktiengesellschaft, Munich (DE)

(72) Inventor: Stefan Jerg, Kranzberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 3 days.

(21) Appl. No.: 19/102,565

(22) PCT Filed: Jul. 4, 2023

(86) PCT No.: PCT/EP2023/068379
§ 371 (c)(1),
(2) Date: Feb. 10, 2025

(87) PCT Pub. No.: WO2024/032978
PCT Pub. Date: Feb. 15, 2024

(65) Prior Publication Data

US 2026/0054726 A1 Feb. 26, 2026

(30) Foreign Application Priority Data

Aug. 11, 2022 (DE) ..................... 10 2022 120 239.9

(51) Int. Cl.
*B60W 30/14* (2006.01)
*B60W 50/14* (2020.01)

(52) U.S. Cl.
CPC .......... *B60W 30/146* (2013.01); *B60W 50/14* (2013.01); *B60W 2050/146* (2013.01); *B60W 2540/30* (2013.01); *B60W 2555/60* (2020.02)

(58) Field of Classification Search
CPC ............... B60W 30/146; B60W 50/14; B60W 2555/60; B60W 2050/146; B60W 2540/30
See application file for complete search history.

(56) References Cited

U.S. PATENT DOCUMENTS

2005/0137782 A1* 6/2005 Shinada ........... G08G 1/096725 340/995.13
2012/0059574 A1* 3/2012 Hada .................... G08G 1/0112 701/119

(Continued)

FOREIGN PATENT DOCUMENTS

DE 10 2012 211 967 A1 1/2014
DE 10 2014 211 834 A1 12/2015

(Continued)

OTHER PUBLICATIONS

English language translation of DE 102019115001 A1 (Year: 2020).*

(Continued)

*Primary Examiner* — Naeem Taslim Alam
(74) *Attorney, Agent, or Firm* — Crowell & Moring LLP

(57) ABSTRACT

A method is disclosed for changing a configuration of a speed control system of a vehicle based on detection of a driver behavior pattern. The method may include activating the speed control system, which controls a vehicle speed to a target speed; receiving traffic sign data describing a maximum permitted speed; adopting the maximum permissible speed as the target speed; and detecting a target speed correction describing a change in the target speed. The method may further include detection of a driver behavioral pattern that describes a change in the target speed based on (Continued)

adopting the maximum permitted speed as the target speed; and issuing a proactive configuration change suggestion when the behavior pattern is detected repeatedly, where by accepting the proactive configuration change proposal, the target speed deviates from the maximum permitted speed by a speed offset when the maximum permitted speed is adopted as the target speed.

10 Claims, 1 Drawing Sheet

(56) References Cited

U.S. PATENT DOCUMENTS

| | | | | |
|---|---|---|---|---|
| 2016/0214482 | A1 | 7/2016 | Kim | |
| 2018/0222478 | A1 | 8/2018 | Limbacher | |
| 2019/0225223 | A1 | 7/2019 | Feron et al. | |
| 2020/0108717 | A1 | 4/2020 | Kim | |
| 2021/0331672 | A1 | 10/2021 | Eigel et al. | |
| 2022/0212537 | A1* | 7/2022 | Mcnew | B60K 31/00 |

FOREIGN PATENT DOCUMENTS

| | | | | |
|---|---|---|---|---|
| DE | 10 2015 010 292 | B3 | 1/2017 | |
| DE | 10 2016 011 490 | A1 | 3/2017 | |
| DE | 10 2018 214 234 | A1 | 2/2020 | |
| DE | 10 2018 216 364 | A1 | 3/2020 | |
| DE | 102019115001 | A1 * | 12/2020 | B60W 30/143 |
| GB | 2594720 | A | 11/2021 | |
| KR | 10-2016-0092239 | A | 8/2016 | |
| KR | 10-2020-0044194 | A | 4/2020 | |
| KR | 10-2190528 | B1 | 12/2020 | |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Apr. 2021, pp. 1-41 (41 pages).

International Search Report (PCT/ISA/210) issued in PCT Application No. PCT/EP2023/068379 dated Oct. 11, 2023 with English translation (5 pages).

German-language Written Opinion (PCT/ISA/237) issued in PCT Application No. PCT/EP2023/068379 dated Oct. 11, 2023 with English translation (9 pages).

German-language Search Report issued in German Application No. 10 2022 120 239.9 dated Apr. 3, 2023 with partial English translation (13 pages).

Korean-language Office Action issued in Korean Application No. 10-2025-7001243 dated Jun. 5, 2026 with English translation (10 pages).

* cited by examiner

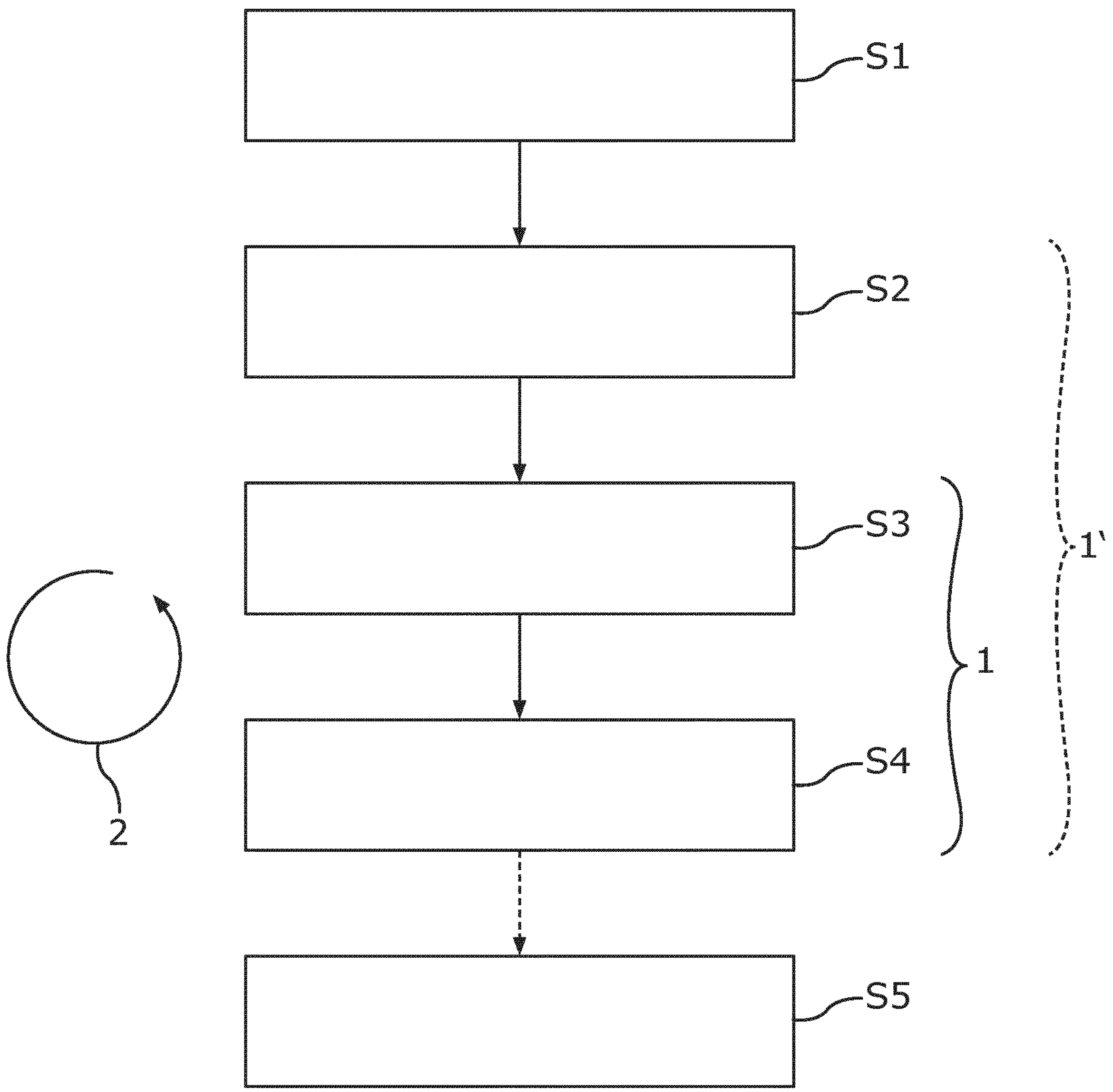
S1
S2
S3
S4
S5
1
1`
2

METHOD FOR PROACTIVELY CHANGING THE CONFIGURATION OF A SPEED CONTROL SYSTEM OF A VEHICLE, COMPUTING DEVICE FOR A SPEED CONTROL SYSTEM, COMPUTER-READABLE (STORAGE) MEDIUM AND A SPEED CONTROL SYSTEM FOR A VEHICLE

BACKGROUND AND SUMMARY

The present invention relates to a method for proactively changing the configuration of a speed control system of a vehicle as a result of a repeatedly detected behavior pattern of the driver of the vehicle. In addition, the present invention relates to a computing device for a speed control system of a vehicle for carrying out such a method. Finally, the present invention relates to a computer-readable (storage) medium and a speed control system for a vehicle.

Speed control systems, in particular so-called adaptive cruise control (ACC), are the driver assistance systems used most in a vehicle. Such speed control systems regulate the speed of the vehicle to a specified target speed. In addition, the target speed can be adapted to regulate the distance to a vehicle driving ahead. Modern speed control systems currently also have a traffic sign recognition function. The speed control systems can thus detect the permitted highest speed and adopt the permitted highest speed as the new target speed automatically and/or after confirmation by the driver.

A speed offset function has contributed significantly to the acceptance of such speed control systems with traffic sign recognition function. Such a speed offset function permits a speed tolerance value or a speed offset to be specified, which is added to the permitted highest speed. For example, if a speed offset of 5 km/h is set, the permitted highest speed +5 km/h is always set as the new target speed.

Document DE 10 2012 211 967 A1 describes a vehicle having a speed control system, which fundamentally regulates a respective current set speed specified by the driver as the target speed and having a speed limiting system, which fundamentally prevents a respective currently specified highest speed from being exceeded. A connecting device is provided between the speed control system and the speed limiting system such that the highest speed of the speed limiting system can be adopted instead of the set speed as the target speed for the speed control system.

It is an object of the present invention to disclose a solution for how a driver of a vehicle which has a speed control system and a traffic sign recognition function can be assisted in the operation of the speed control system.

This object is achieved according to forms of the invention by a method, by a computing device, by a computer-readable (storage) medium, and by a speed control system having the features according to the independent claims. Advantageous refinements of the present invention are specified in the dependent claims.

One form of a method according to the invention for proactively changing the configuration of a speed control system of a vehicle as a result of a repeatedly detected behavior pattern of a driver of the vehicle comprises activating the speech control system of the vehicle, wherein the speech control system regulates a vehicle speed to a target speed. The method additionally comprises receiving traffic sign data which describe a permitted highest speed on a route traveled by the vehicle. In addition, the method according to the invention comprises adopting the permitted highest speed as the target speed for the speed control system. Finally, the method comprises detecting a target speed correction, wherein a change of the target speed is described by the driver of the vehicle by means of the target speed correction. A behavior pattern of the driver is recognized here, wherein the behavior pattern describes the change of the target speed as a result of the adoption of the permitted highest speed as the target speed. In addition, a proactive configuration change proposal is output to the driver if the behavior pattern is repeatedly detected. By accepting the proactive configuration change proposal, if the permitted highest speed is adopted as the target speed, the target speed will deviate in future by a speed offset from the permitted highest speed.

The method is thus used to change a configuration of a speed control system as a result of a repeatedly detected behavior pattern of the driver. Thus, for example, if it is established that after adopting the permitted highest speed as the target speed for the speed control system the driver always corrects the target speed, for example, increases it by 5 km/h, it can thus be proposed to the driver of the vehicle that such a change always be calculated in in future. This is advantageous in particular if the driver of the vehicle is not aware of the speed offset function of the speed control system. It is also advantageous if the driver of the vehicle cannot find the corresponding setting in the speed control system. In other words, the speed offset is recognized as the driver wish and permanently adopted. The speed offset can represent a fixed speed value here (for example, 5 km/h, 10 km/h, 15 km/h). However, the speed offset can also represent a percentage value of the permitted highest speed (for example, 5%, 10%, 15%, 20%). The speed offset can also vary for permitted highest speeds. For example, at a permitted highest speed of 30 km/h, the speed offset can be 5 km/h, whereas the speed offset 20 can be 20 km/h at a permitted highest speed of 130 km/h.

The method can be carried out, for example, by means of a computing device. The computing device can be designed here, for example, as at least one electronic control unit of the vehicle, which comprises one or more programmable processors. Moreover, the computing device can have a computer-readable (storage) medium, on which a computer program is stored. To execute corresponding method steps, such as the recognition of the behavior pattern of the driver, the computer program can be executed on the computing device. The computing device can be part of the speed control system.

The speed control system of the vehicle can be any assistance system which regulates at least the longitudinal guidance of the vehicle. In particular, the speed control system can be a so-called adaptive cruise control system (ACC). However, it is also conceivable that the speech control system is part of an automated driving function. The automated driving function can involve automated driving with an arbitrary degree of automation. Exemplary degrees of automation are assisted, semiautomated, conditionally automated, highly automated, and fully automated driving. The above-mentioned five degrees of automation correspond to SAE levels 1 to 5 of the norm SAE J3016 (SAE—Society of Automotive Engineering) according to the version of Apr. 30, 2021.

The traffic sign data which describe the permitted highest speed on a route traveled and/or to be traveled in future by the vehicle can be provided, for example, by a camera. Such a camera can be configured, for example, for the purpose of detecting and recognizing/classifying traffic signs in the surroundings of the vehicle. However, it is also conceivable that the traffic sign data are provided, for example, by a navigation system or more generally by map data.

The permitted highest speed described by the traffic sign data can then be adopted as the target speed for the speed control system. The adoption can take place, for example, as a result of a driver input. It is conceivable in this case, for example, that the driver of the vehicle has the permitted highest speed displayed to them and then, for example, actuates a SET button. Adopting the permitted highest speed as the target speed for the speed control system can also take place without corresponding input of the driver and therefore automatically, however.

The following example is to illustrate the detection of the target speed correction. If the driver of the vehicle drives with activated speed control system, which regulates the vehicle speed, for example, to 70 km/h as the target speed, and passes a traffic sign in this case, which specifies a permitted highest speed of, for example, 50 km/h, the permitted highest speed of 50 km/h can be adopted as the target speed for the speed control system (instead of 70 km/h). There can be a variety of reasons for a correction of the permitted highest speed as the target speed. For example, it often occurs that exactly observing the permitted highest speed will obstruct a flow of traffic and/or the vehicle will thus become an obstacle for the flow of traffic. A further reason can be that the driver of the vehicle is aware of a leading speedometer, and therefore does not wish to adopt the permitted highest speed directly as the target speed for the speed control system. A leading speedometer refers in this case to a speedometer which displays a vehicle speed which is slightly higher than the actual speed of the vehicle. Independently of the above-mentioned reasons, the driver can increase the target speed, which was set on the basis of the permitted highest speed to 50 km/h, to 55 km/h, for example. In other words, the driver of the vehicle adds a speed offset of 5 km/h. The addition of the speed offset can correspond here to the detection of the target speed correction.

The behavior pattern of the driver, thus the change of the target speed as a result of the adoption of the permitted highest speed as the target speed, can be recognized. For example, it can thus be recognized that the occurrence of this sequence is counted by means of a counter. If this behavior pattern of the driver is repeatedly recognized, a proactive configuration change proposal for the speed control system can be proposed to the driver.

For example, it can be presumed that if this behavior pattern of the driver can be repeatedly recognized, the driver of the vehicle is not aware that a speed offset can be permanently configured in the settings. The driver of the vehicle can be notified of the function by the output of the proactive configuration change proposal. In addition, the corresponding configuration change can be performed directly. A driver of the vehicle can thus be assisted in operating or in performing settings of the speed control system. The proactive configuration change proposal is particularly intuitive for the driver and moreover takes into consideration the behavior of the driver.

A speed offset can be permanently set by the acceptance of the proactive configuration change proposal. If in the future the permitted highest speed is adopted as the target speed for the speed control system, as a result a speed offset will be added to the permitted highest speed. In other words, the target speed will thus deviate in future from the permitted highest speed by a speed offset. The speed offset can have both a positive and a negative sign here. A negative sign can mean a reduction of the target speed.

It can be advantageous if the recognition of the behavior pattern presumes that the change of the target speed takes place within a specified time interval as a result of the adoption of the permitted highest speed as the target speed. In other words, it is advantageous if the change of the target speed as a result of the adoption of the permitted highest speed can be (chronologically) associated with the event of the adoption of the permitted highest speed. It can thus be ensured that the behavior pattern is reliably recognized. For example, such a specified time interval can be 3 seconds, 5 seconds, or the like. Changes of the target speed which do not take place within the specified time interval after the adoption of the permitted highest speed are thus not assigned to the behavior pattern. It can thus be ensured that changes of the target speed which have a cause different under certain circumstances than the adoption of the permitted highest speed as the target speed are not taken into consideration.

Furthermore, it can be advantageous if the recognition of the behavior pattern presumes that the change of the target speed describes a determined speed value. In other words, the behavior pattern can thus be a specific change of the target speed. It is conceivable, for example, that the driver of the vehicle always increases the target speed by 5 km/h or the determined speed value as a result of the adoption of the permitted highest speed as the target speed. However, if the driver of the vehicle only increases the target speed by 3 km/h at another time, this pattern is not associated with the behavior pattern.

It can be particularly advantageous if the speed offset by which the target speed will deviate in future from the permitted highest speed is equal to the determined speed value. It is thus possible to deal individually with the behavior pattern of the driver. The proactive configuration change proposal can in general be a proposal having various speed offsets. However, if the change of the target speed is always the determined speed value, the wish of the driver, thus, for example, to always add 5 km/h to the permitted highest speed as the new target speed, can be dealt with individually.

A further embodiment of the method according to the invention provides that the target speed is increased by means of the target speed correction. In other words, it is thus advantageous if the speed offset is always positive. It can thus be ensured that the vehicle does not inadvertently become a traffic obstacle.

However, it can also be advantageous if the target speed is reduced by means of the target speed correction. Some drivers have an increased need for safety, so that the target speed will possibly be reduced in particular in the case of high permitted highest speeds. In this context, in the recognition of the behavior pattern of the driver, the permitted highest speed described by the traffic sign data can also be taken into consideration. If the driver of the vehicle always reduces the target speed by 10 km/h after a permitted highest speed of, for example, 130 km/h was adopted, this special behavior pattern can be recognized. It is thus possible to deal individually and intuitively with the need for safety of the driver.

In other words, the permitted highest speed can explicitly also be taken into consideration in the behavior pattern. The speed offset of the proactive configuration change proposal can as a result also only be added if the permitted highest speed recognized by means of the traffic sign data corresponds to the permitted highest speed of the corresponding behavior pattern.

Finally, it is also advantageous if the output of the proactive configuration change proposal first takes place when the behavior pattern has been repeatedly detected corresponding to at least a predetermined minimum number. For example, the predetermined minimum number can be 2, 3, 4, 5, or more. If the behavior pattern is thus repeatedly detected three times, for example, the proactive configuration change proposal is output. It can thus be ensured that the behavior pattern of the driver is a pattern in the actual meaning of the word.

A computing device according to the invention for a vehicle is configured to activate a speed control system of the vehicle, wherein the speed control system regulates a vehicle speed to a target speed. The computing device is moreover configured to receive traffic sign data which describe a permitted highest speed on a route traveled by the vehicle. In addition, the computing device is configured to adopt the permitted highest speed as the target speed for the speed control system and to detect a target speed correction, wherein a change of the target speed by the driver of the vehicle is described by means of the target speed correction. The computing device is configured here to recognize a behavior pattern of the driver, wherein the behavior pattern describes the change of the target speed as a result of the adoption of the permitted highest speed as the target speed, and to output a proactive configuration change proposal if the behavior pattern is repeatedly detected. Finally, the computing device is configured to detect an acceptance of the proactive configuration change proposal, as a result of which, upon the adoption of the permitted highest speed as the target speed, the target speed will in future deviate by a speed offset from the permitted highest speed. The computing device can be designed, for example, as an electronic control unit which comprises one or more programmable processors.

A computer-readable (storage) medium according to the invention comprises commands which, upon the execution by a computing device, prompt it to activate a speed control system of the vehicle, wherein the speed control system regulates a vehicle speed to a target speed. In addition, the computer-readable (storage) medium comprises commands which, upon the execution by a computing device, prompt it to receive traffic sign data which describe a permitted highest speed on a route traveled by the vehicle. Moreover, the computer-readable (storage) medium comprises commands which, upon the execution by a computing device, prompt it to adopt the permitted highest speed as the target speed for the speed control system and to detect a target speed correction, wherein a change of the target speed by the driver of the vehicle is described by means of the target speed correction. The computer-readable (storage) medium comprises commands which, upon execution by a computing device, prompt it to recognize a behavior pattern of the driver, wherein the behavior pattern describes the change of the target speed as a result of the adoption of the permitted highest speed as the target speed, and to output a proactive configuration change proposal if the behavior pattern is repeatedly detected. Finally, the computer-readable (storage) medium comprises commands which, upon the execution by a computing device, prompt it to detect an acceptance of the proactive configuration change proposal, as a result of which, upon the adoption of the permitted highest speed as the target speed, the target speed will in future deviate by a speed offset from the permitted highest speed.

A speed control system according to the invention for a vehicle comprises a computing device according to the invention. In addition, the speed control system according to the invention comprises a display device configured to output the proactive configuration change proposal. Finally, the speed control system according to the invention comprises an input device configured to detect the adoption of the proactive configuration change proposal.

A further aspect of the invention relates to a computer program comprising commands which, upon the execution of the program by a computing device, prompt it to carry out a method according to the invention and advantageous embodiments thereof. Furthermore, the invention relates to a vehicle comprising a speed control system according to the invention. The vehicle can be designed in particular as a passenger vehicle.

The preferred embodiments presented with reference to the method according to the invention and the advantages thereof apply accordingly to the computing device according to the invention, to the computer-readable (storage) medium according to the invention, and to the speed control system according to the invention. Furthermore, the preferred embodiments presented with reference to the method according to the invention and the advantages thereof also apply to the computer program according to the invention and to the vehicle according to the invention.

Further features of the invention result from the claims, the FIGURE, and the description of the FIGURE. The features and combinations of features mentioned above in the description and the features and combinations of features mentioned hereinafter in the description of the FIGURE and/or solely shown in the FIGURE are usable not only in the respective specified combination but also in other combinations or alone, without departing from the scope of the invention.

BRIEF DESCRIPTION OF THE DRAWING

The invention will now be explained in more detail on the basis of preferred exemplary embodiments and with reference to the appended drawing. In the drawing:

FIG. 1 shows a schematic representation of one form of a method according to the invention for proactively changing the configuration of a speed control system of a vehicle as a result of a repeatedly detected behavior pattern of a driver of the vehicle.

DETAILED DESCRIPTION OF THE DRAWING

FIG. 1 shows method steps of one form of a method according to the invention for proactively changing the configuration of a speed control system of a vehicle as a result of a repeatedly detected behavior pattern of a driver of the vehicle. In step S1, the speed control system of the vehicle is activated. The speed control system regulates a vehicle speed to a target speed. In step S2, traffic sign data can be received. The traffic sign data can be provided, for example, by a camera of the vehicle. The camera can be configured for recognizing traffic signs or for recognizing a permitted highest speed. The traffic sign data can also be provided, however, by a navigation system or more generally by a map database. In step S3, the permitted highest speed is adopted as the target speed for the speed control system. In step S4, a target speed correction is detected. The target speed correction can describe a change of the target speed by the driver of the vehicle.

For example, traffic sign data can be received in step S2, which describe a permitted highest speed of 100 km/h. In step S3, the permitted highest speed of 100 km/h can be adopted as the target speed for the speed control system. In other words, the speed control system thus regulates the vehicle speed as a result of this to the adopted permitted highest speed or to the target speed. In step S3, the driver of the vehicle can increase the target speed from 100 km/h to 110 km/h, for example. Steps S3 and S4 describe a behavior pattern 1 of the driver. The behavior pattern 1 describes the change of the target speed as a result of the adoption of the additional highest speed as the target speed.

If the behavior pattern 1 is repeatedly detected (indicated by the arrow 2), a proactive configuration change proposal can be output. The repeated detection of the behavior pattern 1 can indicate that the driver of the vehicle generally wishes a speed offset. Such a speed offset can be proposed to the driver of the vehicle in the scope of the proactive configuration change proposal S5.

It can also be advantageous if the behavior pattern 1 also comprises the reception of the traffic sign data. This is indicated in FIG. 1 by 1'. For example, it can thus be advantageous if the behavior pattern 1 can always be assigned to a permitted highest speed. In other words, it can thus be helpful if a speed offset is only added in the case of specific permitted highest speeds.

The invention claimed is:

1. A method for proactively changing a configuration of a speed control system of a vehicle as a result of a repeatedly detected behavior pattern of a driver of the vehicle, the method comprising:

activating the speed control system of the vehicle, wherein the speed control system regulates a vehicle speed to a target speed;

receiving traffic sign data, which describes a permitted highest speed on a route traveled by the vehicle;

adopting the permitted highest speed as the target speed for the speed control system;

detecting a target speed correction, wherein a change of the target speed by the driver of the vehicle is described by means of the target speed correction;

recognizing a behavior pattern of the driver, wherein the behavior pattern describes a change of the target speed as a result of the adoption of the permitted highest speed as the target speed;

outputting a proactive configuration change proposal to the driver when the behavior pattern is repeatedly detected; and detecting an acceptance of the proactive configuration change proposal, thereby causing the target speed to deviate by a speed offset from the permitted highest speed upon the adoption of the permitted highest speed as the target speed.

2. The method of claim 1, wherein the recognition of the behavior pattern presumes that the change of the target speed takes place within a specified time interval as a result of the adoption of the permitted highest speed as the target speed.

3. The method of claim 1, wherein the recognition of the behavior pattern presumes that the change of the target speed describes a specific speed value.

4. The method of claim 3, wherein the speed offset by which the target speed will deviate in the future from the permitted highest speed is equal to the specific speed value.

5. The method of claim 1, wherein the target speed is increased by means of the target speed correction.

6. The method of claim 1, wherein the target speed is reduced by means of the target speed correction.

7. The method of claim 1, wherein the output of the proactive configuration change proposal first takes place when the behavior pattern is repeatedly detected at least a predetermined minimum number of times.

8. A computing device for a vehicle comprising a processor, which is configured to:

activate a speed control system of the vehicle, wherein the speed control system regulates a vehicle speed to a target speed;

receive traffic sign data, which describe a permitted highest speed on a route traveled by the vehicle;

adopt the permitted highest speed as the target speed for the speed control system;

detect a target speed correction, wherein the change of the target speed by the driver of the vehicle is described by means of the target speed correction;

recognize a behavior pattern of the driver, wherein the behavior pattern describes the change of the target speed as a result of the adoption of the permitted highest speed as the target speed;

output a proactive configuration change proposal when the behavior pattern is repeatedly detected; and detect an acceptance of the proactive configuration change proposal, as a result of which the target speed will subsequently deviate by a speed offset from the permitted highest speed upon the adoption of the permitted highest speed.

9. A computer-readable storage medium, comprising commands which, upon execution by a computing device, cause the computing device to:

activate a speed control system of the vehicle, wherein the speed control system regulates a vehicle speed to a target speed;

receive traffic sign data, which describe a permitted highest speed on a route traveled by the vehicle;

adopt the permitted highest speed as the target speed for the speed control system;

detect a target speed correction, wherein the change of the target speed by the driver of the vehicle is described by means of the target speed correction;

recognize a behavior pattern of the driver, wherein the behavior pattern describes a change of the target speed as a result of the adoption of the permitted highest speed as the target speed;

output a proactive configuration change proposal when the behavior pattern is repeatedly detected, and detect an acceptance of the proactive configuration change proposal, as a result of which the target speed will in future deviate by a speed offset from the permitted highest speed upon the adoption of the permitted highest speed.

10. An assistance system for a vehicle, comprising:

a computing device according to claim 8;

a display device configured to output the proactive configuration change proposal, and an input device configured to detect the acceptance of the proactive configuration change proposal.

* * * * *